US006660074B1

(12) United States Patent
Lamparello

(10) Patent No.: US 6,660,074 B1
(45) Date of Patent: Dec. 9, 2003

(54) ELECTRODES FOR GAS DISCHARGE LAMPS; EMISSION COATINGS THEREFORE; AND METHODS OF MAKING THE SAME

(75) Inventor: Timothy Lamparello, Martinsville, NJ (US)

(73) Assignee: EGL Company, Inc., Berkekey Heights, NJ (US)

( * ) Notice: Subject to any disclaimer, the term of this patent is extended or adjusted under 35 U.S.C. 154(b) by 364 days.

(21) Appl. No.: 09/714,069

(22) Filed: Nov. 16, 2000

(51) Int. Cl.[7] .......... C09D 1/00
(52) U.S. Cl. .......... 106/286.3
(58) Field of Search .......... 106/286.3

(56) References Cited

U.S. PATENT DOCUMENTS 2,084,911 A * 6/1937 Kayatt .......... 445/51
3,536,526 A 10/1970 Month
3,615,901 A 10/1971 Medicus
3,625,759 A 12/1971 Williams
3,760,218 A 9/1973 Cronin
3,766,423 A 10/1973 Menelly
3,879,830 A 4/1975 Buescher
4,052,634 A 10/1977 De Kok
4,097,762 A 6/1978 Hilton et al.
4,135,117 A 1/1979 DuBois
4,303,848 A 12/1981 Shimizu et al.
4,415,835 A 11/1983 Mishra et al.
4,703,224 A 10/1987 Rattay
4,748,375 A 5/1988 Lindmayer
4,810,926 A 3/1989 Schwarz et al.
5,277,637 A 1/1994 LindmayerDerks
5,530,314 A 6/1996 Banno et al.
5,726,524 A 3/1998 Debe
5,754,002 A 5/1998 Haitko et al.
5,776,623 A 7/1998 Heng et al.
5,847,497 A 12/1998 Mehrotra et al.
5,872,422 A 2/1999 Xu et al.
6,033,924 A 3/2000 Pack et al.

OTHER PUBLICATIONS

Stratman, Wayne: Neon techniques; Hanbook of Neon Signs and Cold Cathode Lighting, 4th Edition, (Jun. 1997) pp. 29 and 31.

Kirk–Othmer; Encyclopedia of Chemical Technology 4th Edition (John Wiley & Sons, NY (1993), vol. 5, pp 599–602 & 629–633; vol. 13, pp 27–29; vol. 1, pp 601–620; and vol. 5, pp 698–728.

* cited by examiner

*Primary Examiner*—David Brunsman
(74) *Attorney, Agent, or Firm*—Thomas L. Adams

(57) ABSTRACT

Improved emission coating formulation, an electrode blank having the emission coating thereon, the electrode resulting from firing such a coated electrode blank, and the gas discharge electric devices utilizing such fired electrodes are claimed wherein the improvement is in the incorporation of iron oxide and/or cobalt oxide (a) into the emission coating formulation, (b) having a separate iron oxide and/or cobalt oxide coating layer on the electrode blank, or (c) firing the electrode blank with iron oxide and/or cobalt oxide being placed in the immediate environment of the coated electrode blank prior to firing the electrode. Improvements which result include the reduction of carbon deposits or blackening on the electrode and the gas discharge electric device internal surfaces; reduction in the operating temperature of the device, increased linear footage of devices that can run from a given transformer; reduced power requirements; reduction in the number of transformers needed for a given linear footage of devices; and improved quality and consistency of electrode production; among others.

6 Claims, No Drawings

ELECTRODES FOR GAS DISCHARGE LAMPS; EMISSION COATINGS THEREFORE; AND METHODS OF MAKING THE SAME

CROSS-REFERENCE TO RELATED APPLICATIONS

Not Applicable

STATEMENT REGARDING FEDERALLY SPONSORED RESEARCH OR DEVELOPMENT

Not Applicable

1. Field of the Invention

The present invention relates to the field of cold electrodes for gas discharge electrical devices, especially to emission coatings on such electrodes, and the manner of making the same. The invention most particularly relates to such electrodes for use in gas discharge lamps such as neon lights and signs.

2. Background of the Invention

Gas discharge electrical devices, especially neon lamps and signs have been commercially available for decades. Typically, such a device is made up of a phosphor or fluorescent material coating a transparent or translucent material generally tubular in shape and having an electrode at each end. The interior of the device is filled with a conductive gas and is under reduced pressure. On application of a voltage across the electrodes, the current arcs through the gas to the opposing electrode, causing the emission of radiation for perception by a viewer. An intermediary activating material such as mercury may also be involved, as in many so-called neon lamps. In that variation, the current excites the mercury to emit radiation, which radiation excites the fluorescent or phosphor coating. As is generally known, "neon" lamps need not contain neon, but any rare gas of Group VIIIA of the Periodic Table is acceptable.

The electrodes for these devices are made of metal (frequently nickel plated steel) and typically contain an emission coating. They may also contain a ceramic collar. Both the emission coating and the ceramic collar help to reduce sputtering and extend electrode life. See particularly Strattmen: Neon techniques: Handbook of Neon Signs and Cold Cathode Lighting $4^{th}$ Ed., 1997, pages 29 and 31. The emission coating is made up of a mixture of metal carbonates and/or peroxides where the metal is typically selected from barium, strontium, and calcium, although carbonates and/or peroxides of other metals may be present as well. These coatings are typically formed by applying solutions or suspensions of these compounds to the proper surfaces of the electrodes and, on construction of the device, firing it up well above normal operating current, which causes extensive heating of the electrodes whereby the carbonates and/or peroxides are converted to the corresponding oxides (sintering), with release of the carbon (of the carbonate). The release of the carbon (of the carbonate) tends to foul the electrodes resulting in an inelegant appearance and customer dissatisfaction.

To insure that the electrodes are sufficiently heated to result in the conversion, the electrodes are generally viewed visually with a recognition that the entire electrode needs to be "red-hot". Glass temperature of the lamp may also be monitored in standard fashion as known in the art. In typical fashion, more than one lamp is fired up simultaneously, so that all the electrodes in the firing need to be completely "red-hot" for assurance that the required conversion takes place on all of the electrodes.

It has been noted that if an electrode does not turn "red hot" completely, that electrode has a significantly shorter life or requires greater power consumption. Similarly, if the process is continued to assure the slower heating electrode turns "red hot", the other electrodes may be "overcooked" resulting in product failures as well.

In addition, the process described above results in the release of carbon, which typically deposits on the surfaces of the electrode, the ceramic cap of the electrode (where a ceramic cap is present), and/or the device inner surface. These "black spots" appear to the device user as defects in the ultimate product, regardless of whether there is in fact any defect.

Thermal emissive electronics and electrodes therefor are discussed in a number of references including U.S. Pat. Nos. 3,625,759; 3,615,901; 5,847,497, 3,760,218; 4,810,926; 4,135,117; 3,766,423; 4,097,762; 4,303,848; 4,052,634; 4,748,375; 5,754,002; and 6,033,924; all of which are incorporated herein by reference.

U.S. Pat. No. 3,625,759 discusses electrodes for thermal emissive electronics and improvements in the electrodes by coating the emission coating carbonate particles with metal salts prior to applying the emission coating to the substrate electrode body. The metal salts are soluble salts. This insures that the metals being introduced remain more uniformly dispersed with the carbonates than merely mixing in metal powders with the carbonates. The metal salts are salts of nickel, cobalt, and iron. Specific iron salts which are mentioned are the nitrate, acetate, formate, and stearate. No specific cobalt compound is mentioned and no oxide of any of the metals as the metal salt is disclosed.

U.S. Pat. No. 3,615,901 mentions nickel/nickel oxide mixtures with the typical alkaline earth oxide emission coatings for making plastically shapeable cathodes. After sintering, the sintered material on the nickel substrate is then compacted into an appropriate shape.

U.S. Pat. No. 5,847,497 relates to multiple layer electrodes and mentions incorporation of the Group VIIIB metals (free metal) with the further incorporation of sintering aids such as lithium oxide or titanium oxide.

U.S. Pat. No. 3,760,218 includes cobalt oxide or manganese oxide into the emission coating of barium oxide/calcium oxide used in gas discharge electrodes. No carbonates are referred to in that reference.

U.S. Pat. No. 4,810,926 includes transition metals, but says nothing about the oxides. The specific transition metals discussed do not include iron or cobalt.

U.S. Pat. No. 4,135,117 mentions using iron oxide on a conductive segmented phosphor electrode, an electrode very different from the present invention.

U.S. Pat. No. 3,766,423 mentions including iron and/or nickel metal into mixtures of the standard emission coatings. The corresponding oxides are not mentioned.

U.S. Pat. No. 4,097,762 relates to xenon discharge lamps and the problem of electrode material depletion. The solution of this patent is to include aluminum oxide so as to prevent the "evaporation" of electrode materials. Neither iron oxides nor cobalt oxides are mentioned.

U.S. Pat. No. 4,303,848 relates to the problem of blackening. The solution there is to add Yttrium Oxide, Zirconium Oxide, and/or Aluminum Oxide. Neither iron oxides nor cobalt oxides are mentioned.

U.S. Pat. No. 4,052,634 mentions using rare earth metal oxides. Neither iron oxides nor cobalt oxides are mentioned.

U.S. Pat. No. 4,748,375 refers to including indium tin oxide.

U.S. Pat. No. 5,754,002 includes ferrous oxide or cuprous oxide in mercury gas discharge lamps, but those oxides are kept segregated from the emission coating and from the mercury in the lamps until such time as the lamp is discarded and crushed in the course of disposing of the lamp in landfill. The oxides mentioned are asserted to be antioxidants to prevent the mercury from being converted to soluble form by ferric ions, among others.

U.S. Pat. No. 6,033,924, while limited to field emission devices, mentions barium-copper-oxides at Col. 4.

While the art refers to oxides in electrode emission coatings, none of the references teach or suggest inclusion of an iron oxide or a cobalt oxide in the carbonate pre-sintering formulation of the emission coating formulation. None of the references teach or suggest the resulting electrodes of the invention or the electrical devices that incorporate the electrodes of the present invention.

OBJECTS OF THE INVENTION

It is therefore an object of the invention to provide an emission coating for a gas discharge electrode that improves the appearance of the post treatment (firing to convert the carbonates to oxides) electrodes.

It is a further object of the invention to provide an emission coating for a gas discharge electrode that improves the appearance of the gas discharge electrical device constructed from such electrodes.

It is still another object of the invention to provide a gas discharge electrode that has reduced carbon deposits after the conversion of the emission coating carbonates to oxides.

It is still another object of the invention to provide a gas discharge device having reduced carbon deposits therein.

An even further object of the invention is to provide an emission coating for a gas discharge electrode that results in more uniform conversion of emission coating carbonates to oxides.

Still a further object of the invention is to provide a gas discharge electrode having improved consistency in heating above normal operating current for conversion of emission coating carbonates to oxides.

An even further object of the invention is to provide a gas discharge device operating to deliver a specific non-heat energy output with a lower power consumption than the same device in the absence of the invention.

It is still another object of the invention to provide a gas discharge device operating to deliver a specific non-heat energy output while generating less heat than devices without the invention.

Yet another object of the invention is to provide the ability to increase the linear footage of lighting that can be utilized with any given transformer.

Still another object of the invention is to provide "neon signs" which can be operated at lower costs to the user than a device without the invention.

Yet other objects of the invention will be apparent to those of ordinary skill in this art.

BRIEF SUMMARY OF THE INVENTION

The foregoing objects and others can be achieved by an improvement in the emission coatings used for gas discharge electrodes, improved gas discharge electrodes utilizing such coatings, electrical devices containing such electrodes, and processes for making each of the foregoing, comprising including at least one of an iron oxide and a cobalt oxide either in the electrode environment or as part of the emission coating or as a separate coating layer in conjunction with the typical emission coating mixture, provided that the iron oxide and/or cobalt oxide is so provided at least during the firing step that converts the emission coating carbonates to oxides. A preferred embodiment is the inclusion of ferric oxide or cobaltic oxide. Another preferred embodiment is the inclusion of an iron oxide. The most preferred embodiment is the inclusion of ferric oxide in the emission coating formulation for application to the electrode surface.

DETAILED DESCRIPTION OF THE INVENTION

The present invention is in providing an iron oxide and/or a cobalt oxide (preferably ferric oxide and/or cobaltic oxide, most preferably ferric oxide) in the environment of an electrode having an emission coating (containing metal carbonates for conversion to metal oxides) thereon. The iron oxide and/or cobalt oxide is preferably incorporated into the emission coating formulation that is then applied to the electrode in a single operation. However, if desired, the iron oxide and/or cobalt oxide can be formed as a second coating on the electrode surface or may even be provided as a solid material merely in close proximity to the electrode emission coating. In this last variant, the solid iron oxide and/or cobalt oxide can be powder of fine or gross particles or even in large shaped objects (such as a rusty nail), however, finer particles are preferred over gross particles or large shaped particles. It should be noted that the large shaped objects will aid in the elimination of the carbon deposits, but do not help significantly in the "evening" of the heating of the electrode during the sintering step. In any event, the iron oxide and/or cobalt oxide must be in the environment of the electrode emission coating at least during to the firing that converts the emission coating carbonates to oxides.

Electrodes for use in the present invention can be of any shape, but are typically hollow, generally tubular in shape (along a first axis), and preferably closed at one end. Such generally tubular shaped electrodes can have any cross-sectional (in the plane perpendicular to said first axis) configuration, with circular or regular polygonal being preferred and circular being most preferred. The most preferred electrode shape is a hollow cylinder that is closed at an end. The end closure may be of any shape, but a hollow half sphere is most preferred where the remainder of the electrode is a hollow cylinder. The blanks have either not been heat treated or have been heat treated (generally using a wet hydrogen or cracked ammonia process known in the art) for curing the metal. Such electrode blanks are available commercially from eyelet drawing companies that are well known suppliers in the art. The closed end of the electrode contains the wire lead connected thereto for connection to a power source or return. The open end of the electrode allows for the current to arc toward the opposite electrode through gaseous medium of the gas discharge device. The carbonate containing emission coating formulation is typically applied in any suitable fashion to the interior surface of the hollow electrode. While application of the carbonate containing emission coating to the exterior surface of the electrode is possible, it is less efficient and less desirable. Excess formulation is removed and the adherent portion is allowed to air dry, generally with hot air, typically in the range of about 200° C. to about 300° C., preferably about 225° C. to about 275° C., most preferably about 250° C.

The iron oxide and/or cobalt oxide of the present invention is placed in the environment of the carbonate containing emission coating (which is on the electrode) or applied along with, before, or after, or as part of the carbonate containing emission coating formulation.

The carbonate containing emission coating formulation typically contains, in addition to the carbonates intended to be converted to oxides, solvents and carriers therefore, and thickeners or viscosity enhancers. The carbonates are metal carbonates generally selected from the group consisting of barium, strontium, and calcium, and mixtures thereof, although addition of other carbonates in small quantities to develop particular properties are not precluded.

In addition to the carbonates mentioned above, the emission coating formulation optionally includes a peroxide selected from barium peroxide, strontium peroxide, and calcium peroxide, with barium peroxide being preferred. Other metal peroxides may also be included in small quantities to develop particular properties.

The solvents and carriers that are suitable for use in the carbonate containing emission coating formulation include solvents which can be removed by air drying with or without (mild) heating up to temperatures of about 300° C., preferably up to 275° C., more preferably up to about 250° C. Most preferably, the solvents are removed with air-drying where the air is typically heated. Such solvents and carriers include, without limitation, alcohols (such as methanol, ethanol, and isopropanol); esters such as $C_{1-4}$alkyl-$C_{1-3}$carboxylates (for example butyl acetate and methyl acetate); and di-$C_{1-4}$alkyl ketone such as acetone and methyl-ethyl ketone. A mixture of at least one of each of the alcohols, esters, and ketones is generally suitable. Such mixtures include methanol/butyl acetate/acetone; methanol/methyl acetate/acetone; methanol/butyl acetate/methyl ethyl ketone; methanol/methyl acetate/methyl ethyl ketone; ethanol/butyl acetate/acetone; ethanol/butyl acetate/methyl ethyl ketone; ethanol/methyl acetate/acetone; ethanol/methyl acetate/methyl ethyl ketone; isopropanol/butyl acetate/acetone; isopropanol/butyl acetate/methyl ethyl ketone; isopopanol/methyl acetate/acetone; isopropanol/methyl acetate/methyl ethyl ketone; and methanol/propyl acetate/methyl ethyl ketone for example.

An alternative carrier combination is nitrocellulose and butyl acetate. Generally with this carrier combination, the pre-coated electrode blanks are rolled or immersed in the powder carrier mixture. The coated electrodes (still having residual carrier) are then flamed to remove the residual carrier and if the emission coating (pre-sintered) powders are not desired on the external surfaces of the electrode, they are then removed, typically by polishing.

Suitable thickeners or viscosity enhancing agents include, without limitation, aromatic $C_{1-4}$alkyl esters (such as dibutylphthalates).

A most preferred carbonate containing emission-coating powder formulation (exclusive of the iron oxide and cobalt oxide) comprises barium peroxide, strontium carbonate, calcium carbonate, and optionally barium carbonate as the dry components.

Preferably, the metal carbonates (inclusive of any corresponding peroxide) are included in the carbonate containing emission coating formulation in amounts (neglecting the iron oxide and cobalt oxide) as set forth in the table below (where percents are percents by weight based on the total of the barium, strontium, and calcium powdered compounds and each number is deemed to be preceded by the term "about"):

| | Compound | | |
|---|---|---|---|
| | Barium Cmp | Strontium Cmp | Calcium Cmp |
| Most Generally | 30.1–92% | 7–70% | 0–40% |
| Generally Group A | 85–90% | 7–10% | 2–4% |
| Preferred Group A | 88–89% | 8–9% | 2–3% |
| Most Preferred Group A | 88.8–88.9% | 8.3–8.4% | 2.7–2.8% |
| Preferred Group B | 48–85% | 0–43% | 0–15% |
| More preferred Group B | 48–73% | 9–43% | 4–19% |
| Most Preferred Group B | 48–60% | 37–42% | 6–10% |
| Preferred Group C | 46–56% | 31–42% | 12–13% |
| Preferred Group D | 46–48% | 30–35% | 19–22% |
| Preferred Group E | 38–58% | 42–64% | 0% |
| Preferred Group F | 85% | 0% | 15% |
| Preferred Group G | 44–45% | 44–45% | 10–12% |

Preferably, the thickeners and/or viscosity enhancers are included in the carbonate containing emission coating formulation in amounts of about 0.01 to about 0.03 ml/gram, preferably about 0.0125 to about 0.025 ml/gram, of the dry components (neglecting the iron oxide and cobalt oxide) of the carbonate containing emission coating formulation. The solvents are used in suitable amounts to give reasonable fluidity and viscosity to the formulation to allow for further milling and electrode coating. Variation of these components will be within the abilities of one of ordinary skill in the art, but typically about 2.95 to about 3.15, preferably about 3.0 to about 3.1, most preferably about 3.04 to about 3.06 ml of solvent per gram of powder (inclusive of the carbonates and the peroxide, but exclusive of the iron oxide and cobalt oxide) is used. After the wet milling, the specific gravity of the resulting suspension is preferably adjusted to about 1.150–1.300.

Preferably the iron oxide and/or cobalt oxide is used in the present invention in an amount of about 2.0% to about 7.5% based on the other solid content (metal peroxide and metal carbonate solids content) of the carbonate containing emission coating formulation; preferably about 2% to about 6%, more preferably about 2.5% to about 5%. Preferably, the iron oxide and/or cobalt oxide is present in an amount to provide about 0.72 equivalent to about 9 equivalent of oxide per equivalent of carbonate intended to be converted to oxide, more preferably about 1.44 to about 7.2 equivalents of iron oxide or cobalt oxide per equivalent of carbonate, most preferably about 1.79 to about 6 equivalents of iron oxide per equivalent of carbonate.

The carbonate containing emission coating formulation with the iron oxide and/or cobalt oxide contained therein is applied to the electrode shell surface, preferably the inner surface of the hollow shell, and allowed to dry thereon, typically using unheated or heated air, preferably heated air at about 200° C. to about 300° C., preferably at about 250° C. (or flamed in the nitrocellulose embodiment) to result in an electrode shell having the powders coated thereon in an amount of about 1.18 to about 1.30 milligrams per square inch of internal electrode surface area.

If the iron oxide and/or cobalt oxide is separately applied, it may be applied before or after the carbonate containing emission-coating formulation (in which case, the formulation contains lower amounts or none of the iron oxide and/or cobalt oxide called for by the present invention). In the case where the iron oxide and/or cobalt oxide is merely placed in the environment of the emission coating formulation, it can be added as fine dry powder or as gross particles which may have been or may not have been given particular shapes. These particles or shaped materials are merely placed near the surface or the emission coating formulation, and preferably inside the hollow space of the electrode shell having the dried carbonate containing emission coating on the inner surface of the electrode.

After the carbonate containing emission coating has been dried and any additional iron oxide and/or cobalt oxide has been added in the environment, the electrode shells are assembled with the appropriate fluorescent or phosphor coated glass tubing and wiring with any desired mercury or other activating substance as in the normal manner for lamps of this type and the closed system is evacuated to a pressure of typically less than about 3 millitorr, preferably to about 1 millitorr. A current of about 450 to about 850 milliamp is applied to the evacuated system in stages to fire the electrodes for the conversion of the carbonates in the emission coating to the corresponding oxides. Initially a current of about 250 milliamp is applied until the lamp temperature reaches about 75° C. followed by a current of about 350 to 450 milliamp until a lamp temperature of about 125° C. is reached and then optionally followed by a current of from about 550 to about 850 milliamp. The electrodes turn red-hot after a period of time, and when they are red-hot, the carbonates have been converted to a suitable degree. Total time of the combined current applications varies with a number of parameters, but is typically about 70 to about 230 sec. Under-heating fails to convert sufficient carbonate to oxide which results in defective electrodes. Over-heating can result in glass discoloration, damage to the electrode shell (which is typically a nickel plated steel) which results in faster electrode shell degradation, as well as actual loss of part of the emission coating, resulting in inefficient electrode performance. Each of these problems of underheating and overheating results in a defective lamp. Hence, the evenness of the electrodes in reaching the appropriate temperatures is highly important.

In the conversion process of carbonates to oxides, the released carbon (which would otherwise deposit on the glass or the electrode shell outer surface or the ceramic collar portions, if present, of the electrode and are perceived as a defective product), is instead converted to carbon oxides (carbon monoxide and carbon dioxide) which do not deposit on these surfaces, but are removed from the system. After turning off the electric current and allowing the system to cool, typically to under 60° C., preferably to about 50° C., a suitable gas discharge device gas (a gas typically from Group VIIIA of the Periodic Table) is allowed to enter the system, but the pressure inside the system is maintained from about 5 millitorr to about 25 millitorr. The finished gas discharge lamp is ready to be connected to a suitable electrical circuit for use in the ordinary course.

By use of the iron oxide and/or cobalt oxide in the present invention, especially in the carbonate containing emission coating formulation, the electrodes fire up for conversion of the carbonates to oxides much more evenly; the firing is done more quickly, the fouling of the electrodes and the glass with carbon deposits is eliminated or at least substantially reduced, and the resulting gas discharge electrical devices (especially lamps) run at lower temperatures, have lower power requirements, and can be used in greater footage with the same power transformer as such devices without use of the present invention.

In addition, it has been found that other metal oxides do not provide such a combination of benefits or the electrodes cannot be reasonably made with such other oxides. For example manganese oxide cannot be suitably incorporated into the carbonate containing emission coating formulations as such powder tends to clump and foul the manufacturing equipment, requiring frequent shutting down and cleaning of the formulating equipment. This adds such substantial cost to the process that it is not a practical system.

The present invention will be more clearly understood from the specific embodiments of the following invention, which exemplify, but do not limit, the scope of the invention.

EXAMPLES

Example 1

1.01

A prior art emission coating formulation is prepared by wet milling 8,882 grams of barium peroxide, 840 grams of strontium carbonate, and 278 grams of calcium carbonate with volatile organic solvents to achieve a homogeneous suspension. The specific gravity of the result is adjusted with further volatile organic solvents to a value of 1.150–1.300. The resultant formulation is applied to the interior of a standard nickel plated steel electrode shell (having a generally hollow cylindrical shape with one end closed in a hemispherical portion) and air dried to yield a coated electrode shell having 1.18–1.30 mg of powder per square inch of internal electrode shell surface area.

1.02

A prior art emission coating formulation is prepared by wet milling 5,750 grams of barium carbonate, and 4,250 grams of strontium carbonate, with volatile organic solvents to achieve a homogeneous suspension. The specific gravity of the result is adjusted with further volatile organic solvents to a value of 1.150–1.300. The resultant formulation is applied to the interior of a standard nickel plated steel electrode shell (having a generally hollow cylindrical shape with one end closed in a hemispherical portion) and air dried to yield a coated electrode shell having 1.18–1.30 mg of powder per square inch of internal electrode shell surface area.

1.03

A prior art emission coating formulation is prepared by wet milling 4,800 grams of barium carbonate, 4,245 grams of strontium carbonate, and 950 grams of calcium carbonate with volatile organic solvents to achieve a homogeneous suspension. The specific gravity of the result is adjusted with further volatile organic solvents to a value of 1.150–1.300. The resultant formulation is applied to the interior of a standard nickel plated steel electrode shell (having a generally hollow cylindrical shape with one end closed in a hemispherical portion) and air dried to yield a coated electrode shell having 1.18–1.30 mg of powder per square inch of internal electrode shell surface area.

1.04

A prior art emission coating formulation is prepared by wet milling 5,720 grams of barium carbonate, 3,880 grams of strontium carbonate, and 400 grams of calcium carbonate with volatile organic solvents to achieve a homogeneous suspension. The specific gravity of the result is adjusted with further volatile organic solvents to a value of 1.150–1.300. The resultant formulation is applied to the interior of a standard nickel plated steel electrode shell (having a generally hollow cylindrical shape with one end closed in a hemispherical portion) and air dried to yield a coated electrode shell having 1.18–1.30 mg of powder per square inch of internal electrode shell surface area.

1.05

A prior art emission coating formulation is prepared by wet milling 5,600 grams of barium carbonate, 3,100 grams of strontium carbonate, and 1,300 grams of calcium carbonate with volatile organic solvents to achieve a homogeneous suspension. The specific gravity of the result is adjusted with further volatile organic solvents to a value of 1.150–1.300. The resultant formulation is applied to the interior of a standard nickel plated steel electrode shell (having a generally hollow cylindrical shape with one end closed in a hemispherical portion) and air dried to yield a coated electrode shell having 1.18–1.30 mg of powder per square inch of internal electrode shell surface area.

1.06

A prior art emission coating formulation is prepared by wet milling 4,800 grams of barium carbonate, 3,000 grams of strontium carbonate, and 2,200 grams of calcium carbonate with volatile organic solvents to achieve a homogeneous suspension. The specific gravity of the result is adjusted with further volatile organic solvents to a value of 1.150–1.300. The resultant formulation is applied to the interior of a standard nickel plated steel electrode shell (having a generally hollow cylindrical shape with one end closed in a hemispherical portion) and air dried to yield a coated electrode shell having 1.18–1.30 mg of powder per square inch of internal electrode shell surface area.

1.07

A prior art emission coating formulation is prepared by wet milling 7,250 grams of barium carbonate, 910 grams of strontium carbonate, and 1,840 grams of calcium carbonate with volatile organic solvents to achieve a homogeneous suspension. The specific gravity of the result is adjusted with further volatile organic solvents to a value of 1.150–1.300. The resultant formulation is applied to the interior of a standard nickel plated steel electrode shell (having a generally hollow cylindrical shape with one end closed in a hemispherical portion) and air dried to yield a coated electrode shell having 1.18–1.30 mg of powder per square inch of internal electrode shell surface area.

Example 2–7

Each of Examples 1.01 through 1.07 is repeated except that to the pre-milling powder mixture, an additional amount (% based on the other powders) of ferric oxide or cobalt oxide (in accordance with the present invention) is added as set forth below. The post-milling specific gravity is adjusted to 1.150–1.300 as in example 1 and the resulting powder weight per unit of electrode internal surface area is 1.18–1.30 mg per square inch. The corresponding Example numbers (such as Example 2.01, 3.01, etc. are based on art Example 1.01 while Example 2.04, 3.04, etc. are based on Example 1.04).

| Example | Compound | Amount |
|---|---|---|
| 2.01 | $Fe_2O_3$ | 2.5 |
| 2.02 | $Fe_2O_3$ | 2.5 |
| 2.03 | $Fe_2O_3$ | 2.5 |
| 2.04 | $Fe_2O_3$ | 2.5 |
| 2.05 | $Fe_2O_3$ | 2.5 |
| 2.06 | $Fe_2O_3$ | 2.5 |
| 2.07 | $Fe_2O_3$ | 2.5 |
| 3.01 | $Fe_2O_3$ | 5 |
| 3.02 | $Fe_2O_3$ | 5 |
| 3.03 | $Fe_2O_3$ | 5 |
| 3.04 | $Fe_2O_3$ | 5 |
| 3.05 | $Fe_2O_3$ | 5 |
| 3.06 | $Fe_2O_3$ | 5 |
| 3.07 | $Fe_2O_3$ | 5 |
| 4.01 | $Fe_2O_3$ | 7.5 |
| 4.02 | $Fe_2O_3$ | 7.5 |
| 4.03 | $Fe_2O_3$ | 7.5 |
| 4.04 | $Fe_2O_3$ | 7.5 |
| 4.05 | $Fe_2O_3$ | 7.5 |
| 4.06 | $Fe_2O_3$ | 7.5 |
| 4.07 | $Fe_2O_3$ | 7.5 |
| 5.01 | $Co_2O_3$ | 2.5 |
| 5.02 | $Co_2O_3$ | 2.5 |
| 5.03 | $Co_2O_3$ | 2.5 |
| 5.04 | $Co_2O_3$ | 2.5 |
| 5.05 | $Co_2O_3$ | 2.5 |
| 5.06 | $Co_2O_3$ | 2.5 |
| 5.07 | $Co_2O_3$ | 2.5 |
| 6.01 | $Co_2O_3$ | 5 |
| 6.02 | $Co_2O_3$ | 5 |
| 6.03 | $Co_2O_3$ | 5 |
| 6.04 | $Co_2O_3$ | 5 |
| 6.05 | $Co_2O_3$ | 5 |
| 6.06 | $Co_2O_3$ | 5 |

-continued

| Example | Compound | Amount |
|---|---|---|
| 6.07 | $Co_2O_3$ | 5 |
| 7.01 | $Co_2O_3$ | 7.5 |
| 7.02 | $Co_2O_3$ | 7.5 |
| 7.03 | $Co_2O_3$ | 7.5 |
| 7.04 | $Co_2O_3$ | 7.5 |
| 7.05 | $Co_2O_3$ | 7.5 |
| 7.06 | $Co_2O_3$ | 7.5 |
| 7.07 | $Co_2O_3$ | 7.5 |

Example 8–14

Emission coating formulations using the barium, strontium, calcium, iron, and cobalt compounds in the amounts set forth in Examples 1–7 are prepared by wet milling the powders in a nitrocellulose/butyl acetate mixture known in the art. Standard nickel plated hollow electrode shell blanks are immersed in the resulting suspension and subsequently rolled and flamed in accordance with typically known procedures. The outer surfaces are then polished to remove any residual powder that may be on the external surface. Use of powder mixtures lacking the iron oxide or cobalt oxide are of the prior art (Example 8) while the remaining Examples 9–14 (having iron oxide at 2.5%, 5.0%, and 7.5% or cobalt oxide at 2.5%, 5.0%, and 7.5%, each based on the barium, strontium, and calcium powder weights) are of the invention.

Example 15

Electrodes 15.1.01–15.14.07 (corresponding to each of the prior examples) are assembled into discharge lamps with each lamp having two of the same type of electrode. A hollow glass tube having a phosphor coating thereon is sealed around an electrode at each end of the tube with a wire lead extending through the end of the tube from the electrode. The hollow opening of the electrode faces the opposite electrode at the other end of the tube. The tube has an opening through which any enclosed gas may be removed and a rare earth gas may later be inserted. Through this opening, a small amount of mercury is added. The tube is then evacuated to a pressure of about 1 millitorr. The electrodes are connected to an electrical power source and subjected to a milliamp schedule as follows with 250 milliamps of current being applied until a lamp temperature of about 75° C. is reached, followed by a current of 350 or 450 milliamp until a lamp temperature of about 125° C. is reached and optionally continuing with a current of 550, 650, 800, or 850 milliamp:

| Schedule # | current in milliamps | | |
|---|---|---|---|
| 1 | 250 | 450 | 650 |
| 2 | 250 | 450 | 800 |
| 3 | 250 | 450 | 850 |
| 4 | 250 | 450 | |
| 5 | 250 | 350 | 550 |

Electrodes of the following types are coated with the formula of Example 1.01 and subjected to the appropriate milliamp schedule. The results are reported below:

| Electrode Type | Metal Heat Treatment | Milliamp Schedule | Current Time applied | Shell Discolor | Glass Discolor | Collar Discolor | Evenness |
|---|---|---|---|---|---|---|---|
| 8CC | Wet H | 2 | 128 sec | No | Dark | Dark | Not Even |
| 8CC | Cr. Amm. | 2 | 128 sec | No | No | Slight | Not Even |
| 8CMC | Cr. Amm | 5 | 138 sec | No | No | Slight | Not Even |
| 19LCC | unheated | 3 | 247 sec | Slight | Slight | Slight | Not Even |
| 9CMC | Cr. Amm | 4 | 88 sec | No | No | Dark | Not even |

All of the prior art electrodes test show a lack of evenness of turning “red-hot” and ceramic collar discoloration. Glass discoloration in the lamp varied from none to dark, but shell discoloration is either none or slight.

Example 16

Electrodes having coatings of the formula of Example 2.01 were prepared otherwise as stated in Example 15 and tested for discoloration and evenness according to the following table. All of these electrodes contained 2.5% ferric oxide relative to the combined total of the barium, strontium, and calcum powders.

| Electrode Type | Metal Heat Treatment | Milliamp Schedule | Current Time applied | Shell Discolor | Glass Discolor | Collar Discolor | Evenness |
|---|---|---|---|---|---|---|---|
| 8CC | None | 1 | 129 sec | No | Slight | Slight | Even |
| 8CC | Wet H | 2 | 107 sec | No | No | Slight | Even |
| 8CC | Cr. Amm. | 2 | 110 sec | No | No | No | Even |

All of the test samples result in electrodes which turned red-hot evenly, with no shell discoloration, and either no or only slight discoloration of the glass or ceramic collar.

Example 17

Electrodes with coatings of the formula of Example 3.01 are prepared otherwise as stated in Example 15 and tested for discoloration and evenness according to the following table. All of these electrodes contain 5% ferric oxide relative to the combined total of the barium, strontium and calcium powders.

| Electrode Type | Metal Heat Treatment | Milliamp Schedule | Current Time applied | Shell Discolor | Glass Discolor | Collar Discolor | Evenness |
|---|---|---|---|---|---|---|---|
| 8CC | Wet H | 2 | 86 sec | No | No | No | Even |
| 8CC | Wet H | 2 | 104 sec | No | No | No | Even |
| 8CC | Cr. Amm | 2 | 106 sec | No | No | No | Even |
| 8CC | Cr. Amm | 2 | 104 sec | No | No | No | Even |
| 8CC | Cr. Amm | 2 | 121 sec | No | No | Slight | Even |
| 8CC | Cr. Amm. | 2 | 101 sec | No | No | Slight | Even |
| 8CC | Cr. Amm. | 2 | 92 sec | No | No | No | Not Even |
| 8CC | Cr. Amm | 1 | 107 sec | No | No | Slight | Even |
| 8CC | Cr. Amm | 2 | 101 sec | No | Dark | Slight | Even |
| 8CC | Cr. Amm | 2 | 100 sec | No | No | No | Even |
| 8CC | Cr. Amm | 2 | 98 sec | No | No | Slight | Even |
| 8CC | Cr. Amm | 2 | 99 sec | No | No | No | Even |
| 8CMC | Cr. Amm | 5 | 108 sec | No | No | No | Even |
| 8CMC | Cr. Amm | 5 | 106 sec | No | No | Slight | Even |
| 19LCC | None | 3 | 222 sec | No | No | No | Even |
| 19LCC | None | 3 | 219 sec | No | No | Slight | Even |
| 9CMC | Cr. Amm | 4 | 75 sec | No | No | No | Even |
| 9CMC | Cr. Amm | 4 | 76 sec | No | No | No | Even |

With the exception of one sample, all of the 18 samples test turn red-hot in an even manner, and that sample has no discoloration of the shell, glass, or of the ceramic collar.

Example 18

Electrodes with coatings similar to that of the formula of Example 3.01 except that twice as much ferric oxide is used (10% ferric oxide instead of the 5% used in sample 3.01) are prepared otherwise as stated in Example 15 and tested for discoloration and evenness according to the following table.

| Electrode Type | Metal Heat Treatment | Milliamp Schedule | Current Time applied | Shell Discolor | Glass Discolor | Collar Discolor | Evenness |
|---|---|---|---|---|---|---|---|
| 8CC | Cr. Amm. | 2 | 92 sec | No | Dark | Slight | Even |

This shows that excess ferric oxide begins to discolor the glass and the ceramic collar.

Example 19

Electrodes with coatings similar to that of the formula of Example 2.01 except that ½ as much ferric oxide is used (1.25% ferric oxide instead of the 2.5% used in sample 2.01) are prepared otherwise as stated in Example 15 and tested for discoloration and evenness according to the following table.

| Electrode Type | Metal Heat Treatment | Milliamp Schedule | Current Time applied | Shell Discolor | Glass Discolor | Collar Discolor | Evenness |
|---|---|---|---|---|---|---|---|
| 8CC | Cr. Amm. | 2 | 106 sec | No | No | Slight | Even |

This shows that excess ferric oxide begins to discolor the glass and the ceramic collar.

Example 20

Electrodes with coatings of the formula of Example 6.01 are prepared otherwise as stated in Example 15 and tested for discoloration and evenness according to the following table.

| Electrode Type | Metal Heat Treatment | Milliamp Schedule | Current Time applied | Shell Discolor | Glass Discolor | Collar Discolor | Evenness |
|---|---|---|---|---|---|---|---|
| 8CC | Wet H. | 2 | 112 sec | No | No | Slight | Even |
| 8CC | Wet H. | 2 | 114 sec | No | Slight | Slight | Even |
| 8CC | Wet H. | 2 | 115 sec | No | No | Slight | Not Even |

This clearly shows the benefit of utilizing cobalt oxide according to the invention.

Example 21

Lamps are prepared from electrodes having the emission coating formulation of Example 1.01 (art) and from electrodes having the emission coating formulation of Example 3.01 and tested for operating temperature over a period of 1500 hours. The results are shown in the table below.

| | (Temperature in Degrees C) | | |
|---|---|---|---|
| Time (hours) | (ART) Using formulation 1.01 | (Invention) Using Formulation 3.01 | |
| 1 | 100 | 80 | 78 |
| 4 | 103 | 79 | 79 |
| 10 | 106 | 79 | 80 |
| 24 | 104 | 81 | 80 |
| 80 | 104 | 80 | 80 |
| 160 | 103 | 82 | 82 |
| 480 | 104 | 82 | 81 |
| 1000 | 104 | 81 | 84 |
| 1500 | 102 | 82 | 82 |

The lower running temperature of the invention lamps clearly demonstrates that the invention lamps are running with a lower power consumption than the similar lamps according to the art.

Example 22

Lamps are prepared from electrodes having the emission coating formulation of Example 1.01 (art) and from electrodes having the emission coating formulation of Example 3.01 in 8 ft lengths. The glass is 15 mm coated glass in each lamp and each lamp is filled with K-4 argon/neon gas mixture, with a small amount of mercury. Four such lamps are placed in series and connected to a 60 milliamp transformer with 15,000 volts. The amperage drop for each of the art and the invention is measured and reported below.

| Lamp type | Amperage Drop In Milliamps | |
|---|---|---|
| Art (Electrodes using formulation 1.01) | 15 (down to 45) | 14 (down to 46) |
| Invention (Electrodes using formulation 3.01) | 11 (down to 49) | 12 (down to 48) |

The lesser amperage drop shown by the invention lamps as compared to those of the art demonstrates that the invention lamps have a lower resistance and are therefore more efficient than the similar ones of the art.

I claim:

1. An emission coating formulation comprising (a) an iron oxide and/or cobalt oxide which is present in an amount of from a about 1 to about 7.5% based on the weights of components (b) and (c);

(b) at least one metal carbonate of which at least one of said metal carbonates is selected from the group consisting of carbonates of metals selected from the group consisting of barium, strontium and calcium; and (c) optionally at least one metal peroxide of which at least one of said metal peroxides is selected from the group consisting of barium peroxide, strontium peroxide, and calcium peroxide;

said emission coating formulation being compatible for coating a metallic surface of an electrode where said electrode with said emission coating thereon is compatible with exposure to an environment of less than atmospheric pressure and the application of sufficient voltage and/or heat to convert at least a portion of said carbonates to oxides.

2. The emission coating formulation of claim 1 wherein said iron oxide and/or cobalt oxide comprises about 2% to about 6% based on the weight of said components (b) and (c).

3. The emission coating formulation of claim 2 wherein said iron oxide and/or cobalt oxide comprises about 2.5% to about 5% based on the weight of said components (b) and (c).

4. The emission coating formulation of claim 1 wherein said iron oxide is ferric oxide.

5. The emission coating formulation of claim 1 wherein said cobalt oxide is cobaltic oxide.

6. The emission coating formulation of claim 1 wherein said iron oxide and/or cobalt oxide is an iron oxide.

* * * * *